United States Patent
Sizelove

(10) Patent No.: US 12,247,765 B2
(45) Date of Patent: Mar. 11, 2025

(54) LEAK-RESISTANT COUPLING FOR SOLAR HEATER

(71) Applicant: AQUATHERM INDUSTRIES, INC., Lakewood, NJ (US)

(72) Inventor: J. David Sizelove, Belmar, NJ (US)

(73) Assignee: AQUATHERM INDUSTRIES, INC., Lakewood, NJ (US)

( * ) Notice: Subject to any disclaimer, the term of this patent is extended or adjusted under 35 U.S.C. 154(b) by 0 days.

(21) Appl. No.: 18/622,337

(22) Filed: Mar. 29, 2024

(65) Prior Publication Data

US 2024/0328676 A1     Oct. 3, 2024

Related U.S. Application Data

(60) Provisional application No. 63/493,220, filed on Mar. 30, 2023.

(51) Int. Cl.
     *F24S 80/30*      (2018.01)
     *E04H 4/12*      (2006.01)
     *F24S 10/70*      (2018.01)

(52) U.S. Cl.
     CPC .............. *F24S 80/30* (2018.05); *E04H 4/129* (2013.01); *F24S 10/70* (2018.05)

(58) Field of Classification Search
None
See application file for complete search history.

(56) References Cited

U.S. PATENT DOCUMENTS

| | | | |
|---|---|---|---|
| 1,005,145 A | 10/1911 | Bicalky | |
| 1,508,023 A | 9/1924 | Moomy | |
| 3,149,861 A | 9/1964 | Larsson | |
| 3,756,631 A * | 9/1973 | Ross | F16L 21/005 285/236 |
| D234,462 S | 3/1975 | Ahlrot | |
| 4,101,151 A * | 7/1978 | Ferguson | F16L 21/005 285/236 |
| 4,112,921 A * | 9/1978 | MacCracken | F24S 20/67 165/46 |
| 4,172,607 A * | 10/1979 | Norton | F16L 21/005 285/236 |
| 4,216,764 A * | 8/1980 | Clark | F24S 80/70 138/44 |

(Continued)

OTHER PUBLICATIONS

Rubber Coupling Hose internet catalog webpage printout from Solar Pool Supply Company website at https://www.solarpoolsupply.com/products/rubber-coupling-hose; Undated; USA.

(Continued)

*Primary Examiner* — Jorge A Pereiro
(74) *Attorney, Agent, or Firm* — ROBERTS & ROBERTS, LLP; Richard S. Roberts, Jr.

(57) ABSTRACT

Provided is an improved coupling for preventing water leakage in heating systems that include solar collector panels which incorporate plastic or rubber tubes that are connected to inlet and outlet water manifolds. The couplings are reinforced, dual durometer materials that are flexible enough to form a strong seal to any cylindrical tubes or pipes utilized in the heating system as well as rigid enough to tolerate the expansion and contraction of the coupling body during extreme conditions of use.

23 Claims, 3 Drawing Sheets

(56) References Cited

U.S. PATENT DOCUMENTS

| | | | | |
|---|---|---|---|---|
| 4,240,407 | A * | 12/1980 | Spencer | F24S 40/80 126/906 |
| 4,287,883 | A * | 9/1981 | Kyrias | F24S 40/60 126/561 |
| 4,321,911 | A * | 3/1982 | Offutt | F24S 80/30 285/124.1 |
| 4,392,008 | A * | 7/1983 | Cullis | F24S 10/72 126/569 |
| 4,410,757 | A * | 10/1983 | Stamminger | H01L 31/0547 136/246 |
| 4,718,404 | A * | 1/1988 | Sadler | F24S 40/10 126/621 |
| 5,039,137 | A * | 8/1991 | Cankovic | F16L 25/14 285/236 |
| D371,189 | S * | 6/1996 | Dharamsi | D23/269 |
| 5,823,176 | A * | 10/1998 | Harris | F24S 25/50 126/626 |
| 5,842,725 | A | 12/1998 | Allert | |
| D407,802 | S | 4/1999 | Hatfield et al. | |
| 7,264,020 | B2 * | 9/2007 | Wolk | F16L 55/105 138/90 |
| D589,126 | S | 3/2009 | Concannon | |
| 7,731,242 | B2 * | 6/2010 | Coscarella | F16L 29/00 285/236 |
| D623,277 | S | 9/2010 | Guzzoni et al. | |
| 8,474,446 | B1 * | 7/2013 | Rohr | F24S 10/742 126/704 |
| D730,494 | S * | 5/2015 | Arment | D23/262 |
| 9,765,911 | B2 * | 9/2017 | Kenney | F16L 21/005 |
| D873,976 | S | 1/2020 | Simon et al. | |
| 10,972,043 | B2 * | 4/2021 | Alan | H02S 20/23 |
| 11,060,646 | B2 * | 7/2021 | Jacobs | F16L 37/091 |
| 11,592,127 | B2 * | 2/2023 | Belen | F16L 25/14 |
| D994,091 | S * | 8/2023 | Arment | D23/262 |
| 2009/0295153 | A1 * | 12/2009 | Knapp | F16L 21/03 285/331 |
| 2010/0025982 | A1 * | 2/2010 | Jamison | F16L 21/08 285/31 |
| 2015/0285420 | A1 | 10/2015 | Stout et al. | |
| 2015/0369401 | A1 * | 12/2015 | Sizelove | F16L 33/22 138/137 |
| 2018/0292111 | A1 * | 10/2018 | Rutkai | E04H 4/06 |
| 2018/0299052 | A1 * | 10/2018 | Jacobs | F16L 37/091 |
| 2018/0313479 | A1 | 11/2018 | Brinkhuis et al. | |
| 2018/0340642 | A1 | 11/2018 | Quesada | |
| 2018/0363815 | A1 * | 12/2018 | Jacobs | F16L 21/045 |
| 2019/0356264 | A1 * | 11/2019 | Alan | A62C 3/0214 |
| 2021/0062944 | A1 | 3/2021 | Lee | |
| 2021/0301952 | A1 * | 9/2021 | Belen | F16L 21/08 |
| 2022/0018478 | A1 | 1/2022 | Traidia et al. | |
| 2023/0167927 | A1 * | 6/2023 | Belen | F16L 21/08 285/93 |
| 2024/0084933 | A1 * | 3/2024 | Belen | F16L 15/003 |

OTHER PUBLICATIONS

CANTEX 2-in Schedule 40 Schedule 80 Plastic Combination Coupling Conduit Fittings from Lowes.com at https://www.lowes.com/pd/CANTEX-2-in-Combination-Coupling-Schedule-40-PVC-Compatible-Schedule-80-PVC-Compatible-Conduit-Fitting/1000275749; printed Jul. 17, 2023; USA.

Notice of References Cited for Design U.S. Appl. No. 29/873,408.

* cited by examiner (ALONG LINE A-A OF FIG. 2)

LEAK-RESISTANT COUPLING FOR SOLAR HEATER

CROSS-REFERENCE TO RELATED APPLICATION

This application claims the benefit of U.S. Provisional Application Ser. No. 63/493,220, filed on Mar. 30, 2023, the disclosure of which is incorporated by reference herein in its entirety.

BACKGROUND

Technical Field

The disclosure relates to improvements in solar water heating systems for swimming pools and the like. More particularly, the disclosure pertains to improved couplings for preventing water leakage in heating systems including solar collector panels that incorporate plastic, or rubber tubes that are connected to inlet and outlet water manifolds.

Description of the Related Art

The use of solar pool heaters is well known. In one particularly desirable solar heating system, cool water from the pool is pumped into an array of heat exchange tubes formed from a dark, thermoplastic or thermoset rubber material. The tubes capture solar thermal energy, using it to warm the cool pool water. The water is transported through the array and then pumped back into the pool, typically using the same pump that pumps water through the swimming pool filter. Numerous variations of such solar heating systems for swimming pools have been devised. U.S. Pat. No. 6,604,521 teaches a solar water heater comprising a single solar collector pipe that absorbs solar energy to heat water and conveys the heated water through a single passageway. U.S. Pat. No. 8,353,286 teaches a solar water heater comprising an array of interconnected, elongate glass vacuum tubes that collect solar energy and heat water. U.S. Pat. No. 6,679,247 teaches a solar energy collector in the form of a helical coil of tubing.

U.S. pre-grant publication 2020/0355404 teaches a solar water heating system having a solar collector panel that includes an array of plastic, or rubber tubes connected to two plastic water manifolds, with one end of the array of tubes being connected to a water supply manifold and the other end of the array being connected to a water return manifold. Each manifold is a single rigid pipe having a tubular body. Each tube is then secured in place by a thermal butt-welding process, or overmolding a polymeric composition onto both the tube end and the manifold at their junction, forming a mechanical lock.

In each of these solutions of the related art, each manifold is further connected to a network of pipes and/or hoses that transport water from the pool into and through the heating assembly and then back into the pool. As schematically illustrated in FIG. 5, which schematically illustrates a solar heating assembly, a network of manifolds and pipes/hoses of the heating assembly are interconnected through couplings, such as those of this disclosure. When interconnecting multiple manifolds such as illustrated in FIG. 5, it is essential to the performance and integrity of the heating assembly that the connections between the manifolds are water tight and do not leak.

Conventionally, this type of coupling is a cylindrical, hollow body having open ends that is made from a single, extruded polymer and they are tightly secured in place with worm-gear, ratchet-style hose clamps, or the like. However, it is a known problem in the art that such couplings weaken over time from the constant expansion and contraction during use resulting from fluctuations in pressure from the water flowing through the system together with fluctuations in temperature. For example, if the polymer used to make the cylindrical coupling body is hard, it is not sufficiently flexible to form a long lasting strong seal to the tubes and/or the manifolds. However, if the polymer is too soft, it is vulnerable to deformation under the pressures of flowing water which can cause it to stretch and burst.

This problem was addressed by fabricating couplings by compression molding with two different polymeric materials, i.e., a relatively rigid polymer is used to form the medial region of the coupling which resists deformation from use, and a relatively flexible polymer is used to form the lateral (end) regions of the coupling which facilitates strong bonding to the tubes and manifolds. This is referred to in the art as a "dual durometer" material. While such a dual durometer coupling was an improvement over a "single durometer" coupling made from a single polymer (such as taught in commonly owned U.S. pre-grant publication 2015/0369401, which is incorporated by reference herein to the extent consistent with this disclosure), it has been recognized that the dual durometer couplings are still vulnerable to weakening and failure over time due to usage conditions and must eventually be replaced. Therefore, there remains a need in the art for an improved coupling having improved long-term durability when used for connecting parts of a solar water heater. This disclosure provides a solution to this need.

SUMMARY

Provided is a coupling for connecting cylindrical bodies, said coupling comprising:
a) a unitary, hollow, annular body forming first and second cylindrical openings for surrounding a cylindrical body and to thereby facilitate forming a fluid-tight seal between the coupling and the cylindrical body, the unitary annular body comprising a medial portion, a first lateral portion and a second lateral portion, wherein said first and second lateral portions are integrally connected at opposite ends of said medial portion, the medial portion being made from a first material having a first durometer value, and each of the first and second lateral portions being made from a second material having a second durometer value, wherein said second durometer value is lower than said first durometer value;
b) exterior annular clamp positioning rings integrally formed with each of the first and second lateral portions of the unitary annular body, the annular clamp positioning rings comprising said second material, wherein each of said exterior annular clamp positioning rings extends from the exterior surface of said first and second lateral portions of the unitary annular body; and
c) an interior reinforcing ring integrally formed with said medial portion of said annular body, said ring comprising said first material.

Also provided is a solar heating assembly for a pool, said solar heating assembly comprising an array of parallel tubes, each tube having an inlet end connected to an inlet manifold and having an outlet end connected to an outlet manifold, wherein each of said inlet ends is connected to said inlet manifold via a reinforced coupling as provided in this disclosure and wherein each of said outlet ends is connected to said outlet manifold via a reinforced coupling as provided in this disclosure.

Further provided is a solar heater for a pool, said solar heater comprising a heating assembly, which heating assembly comprises a plurality of interconnected inlet and outlet manifolds; wherein each of said inlet manifolds interconnected with each other via one or more reinforced couplings as provided in this disclosure, and wherein each of said outlet manifolds are interconnected with each other with each other via one or more reinforced couplings as provided in this disclosure.

DETAILED DESCRIPTION

Figure 1:
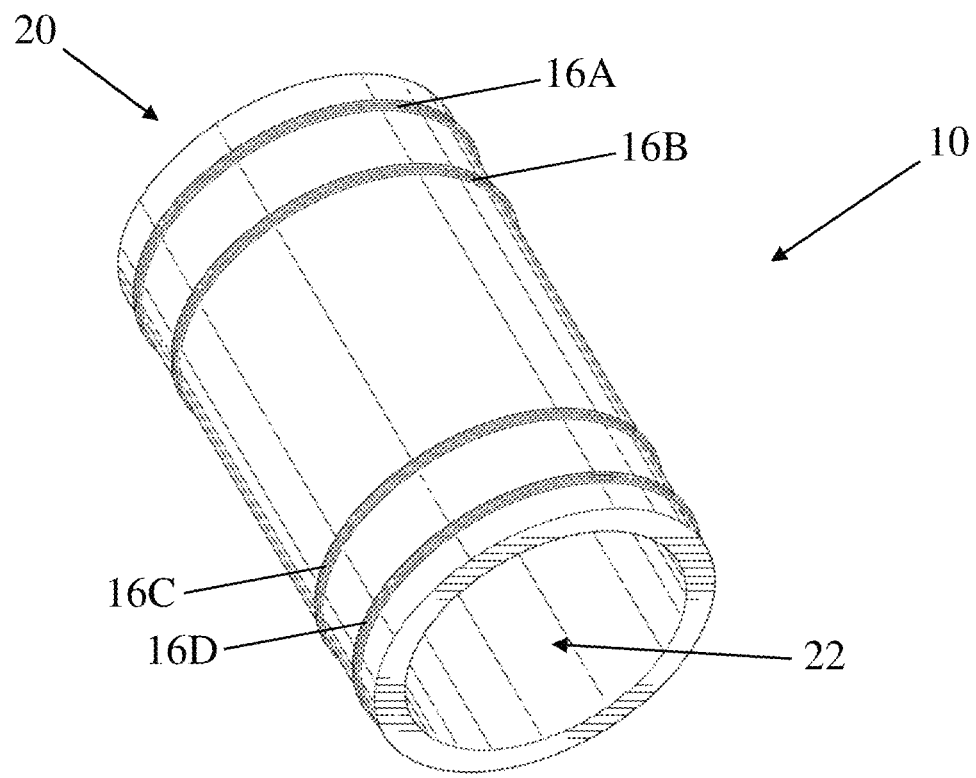
FIG. 1 is a perspective-view of a coupling showing the exterior annular clamp positioning rings.

The couplings of this disclosure are unitary, hollow, annular bodies fabricated with at least two different polymers, or at least two different polymer compositions. As illustrated in FIG. 1, a coupling 10 has a generally cylindrical shape which is formed by molding two different polymers (or polymer compositions) using a suitable mold, such as described in commonly-owned pre-grant publication 2015/0369401, which is incorporated by reference herein to the extent consistent with this disclosure. As illustrated, in FIG. 2, the cylindrical coupling 10 has two cylindrical openings 20 and 22 for surrounding a cylindrical body, such as a hose, or any other similar cylindrical inlet/outlet pipe having a smaller diameter than the coupling, allowing a fluid-tight seal to be formed between the coupling and the cylindrical body. The annular body is "unitary" in that the different polymers are molded together in a molten or softened state wherein they are merged together to form a new single, shaped element, i.e., the coupling 10. As such, the annular body of the unitary coupling 10 comprises a medial portion 12, a first lateral portion 14A and a second lateral portion 14B, wherein said first lateral portion 14A and second lateral portion 14B are integrally connected with the medial portion 12 at opposite ends of the medial portion 12. The medial portion 12 is made from a first material having a first durometer value (hardness rating), while each of the first lateral portion 14A and second lateral portion 14A is made from a second material having a second durometer value (hardness rating), wherein the second durometer value is lower than said first durometer value. In this regard, "Durometer value" (or "Durometer") is a standard rubber industry term for hardness as well as a specific hardness measurement device that is also typically referred to as a "Shore durometer" or "indentor"). It is also within the scope of this disclosure that first lateral portion 14A and second lateral portion 14B may be fabricated from different polymers (or different polymer compositions), each of which may have the same durometer value or different durometer values, but is it preferred that each of the first lateral portion 14A and second lateral portion 14B are fabricated from identical polymers (or identical polymeric compositions). In an embodiment where the first lateral portion 14A and second lateral portion 14B are made from different polymers (or different polymeric compositions), each polymer/polymeric composition has a lower durometer value than the first material which is used to fabricate the medial portion 12. As used herein, a durometer value, also known in the art as "Shore hardness" (e.g., "Shore A hardness" for softer polymeric materials; "Shore D hardness" for harder polymeric materials) or as the "Shore durometer value," is defined as the hardness rating of a polymer/polymeric composition, such as rubbers and plastics, which is typically measured with a measurement device, which as noted above is often referred to a "Shore durometer" device or even a just a "durometer" device. Durometer values as used in the art represent a relative comparison of hardness between different but similar materials that have had their hardness measured using the same durometer scale, device and measurement standard, wherein a material having a higher durometer value is harder than a material having a lower durometer value. The durometer hardness value may be measured according to the test method of ASTM D2240.

In the preferred embodiments, the polymer/polymeric composition forming the first material, i.e., the material used to fabricate the medial portion 12 of the annular body, has a durometer value of from about 80 to about 90, more preferably from about 85 to 90 and most preferably from about 88 to about 90. In the preferred embodiments, the polymer/polymeric composition forming the second material, i.e., the material used to fabricate the lateral portions 14A and 14B of the annular body, has a durometer value of from about 70 to about 80, more preferably from about 70 to 75 and most preferably from about 70 to about 72. When first lateral portion 14A and second lateral portion 14B are made from different polymers/polymeric materials, each of the first lateral portion 14A and second lateral portion 14B still preferably have durometer values of from about 70 to about 80, more preferably from about 70 to 75 and most preferably from about 70 to about 72, though the durometer values (hardness values) may be the same or different for each of 14A and 14B. In the most preferred embodiments of this disclosure, the first lateral portion 14A and second lateral portion 14B both comprise, consist of, or consist essentially of the same polymer/polymeric composition and thus have the same durometer value (i.e., the second durometer value), and said second durometer value is at least 5 less than (i.e., softer than) said first durometer value, more preferably at least about 10 less than said first durometer value and most preferably at least about 18 less than said first durometer value.

Figure 2:
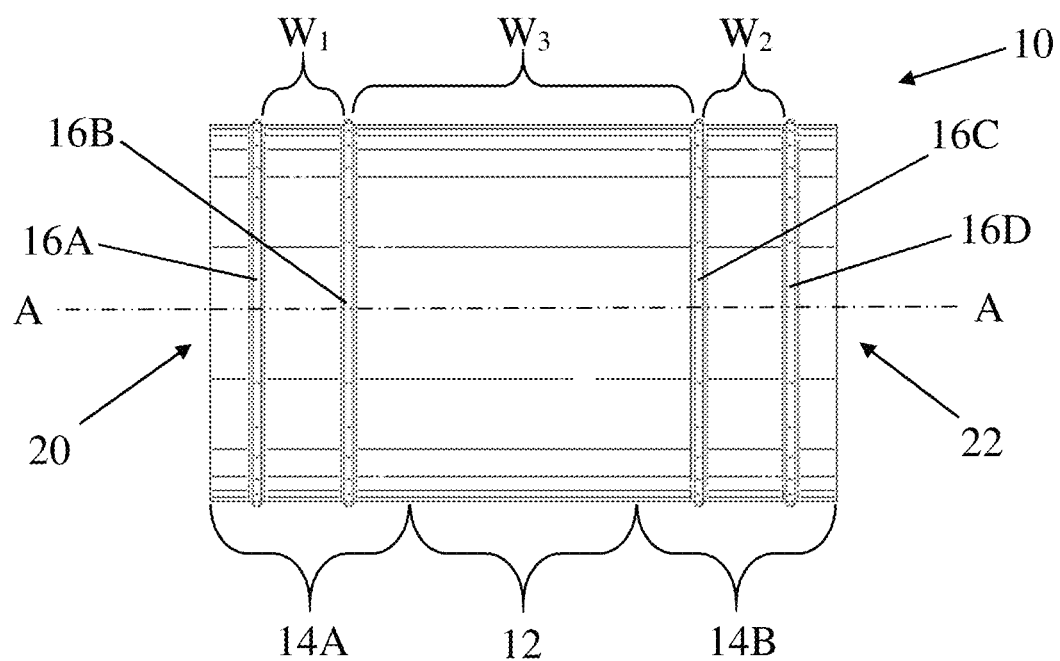
FIG. 2 is a perspective-view of the lateral side of a coupling showing the exterior annular clamp positioning rings.

As exemplified in FIG. 2, it is preferred that each of the medial portion 12, first lateral portion 14A and second lateral portion 14B comprise less than one third of the length of the annular coupling body. However, that is not mandatory. In other embodiments, the medial portion 12 may comprise from about 39% to about 49% of the length of the annular coupling body, or more preferably from about 41% to about 47% of the length of the annular coupling body, while the first lateral portion 14A and second lateral portion 14B each comprise from about 23% to about 33%, or more preferably from about 25% to about 31% of the length of the annular coupling body, with each of portions 14A and 14B preferably being identical in length percentage of the annular body. However, it is not necessary for each of portions 14A and 14B to be of identical lengths for the coupling to achieve its intended purpose.

Figure 4:
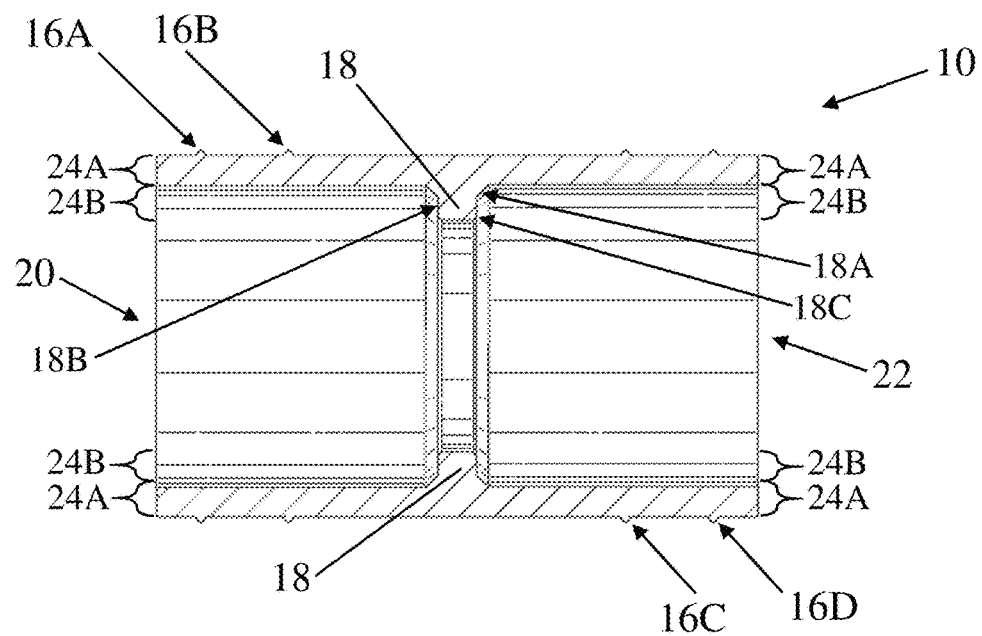
FIG. 4 is a side cross-sectional view of a coupling as sectioned along line A-A of FIG. 2, viewed from either of the two identical sectioned sides, thereby showing the interior reinforcing ring.

As further illustrated in each of FIGS. 1, 2 and 4, the couplings of the disclosure are also fabricated to have exterior annular clamp positioning rings 16A, 16B, 16C and 16D integrally formed with each of the first and second lateral portions of the unitary annular body. These annular clamp positioning rings 16A-D are fabricated with the other components of the coupling in a single molding step, and accordingly are fabricated from the same materials used to fabricate the first lateral portion 14A and second lateral portion 14B. In an embodiment where the first lateral portion 14A is fabricated from a different material (polymer/polymer composition) than the second lateral portion 14B, positioning rings 16A and 16B are thus fabricated from the same material (polymer/polymer composition) as the first lateral portion 14A while positioning rings 16C and 16D are fabricated from the same material (polymer/polymer composition) as the second lateral portion 14B. Most preferably, lateral portions 14A and 14B as well as rings 16A-16D are all fabricated from identical materials material (identical polymers/polymer compositions).

Figure 3:
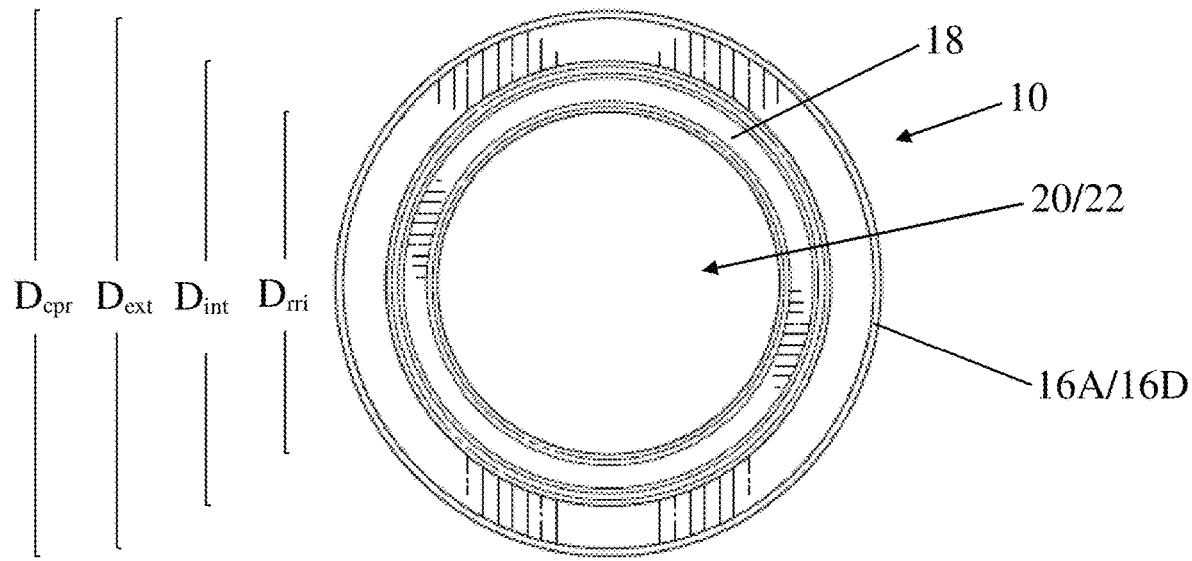
FIG. 3 is an end-view of the coupling showing the hollow interior of the coupling and the interior reinforcing ring.

As illustrated, each of said exterior annular clamp positioning rings extend (protrude) from the exterior surface of said first and second lateral portions of the unitary annular body. Their height and shape are not critical to this disclosure so long as they are sufficient to aid in positioning conventional hose clamps in the proper location. In the preferred embodiments, these clamp positioning rings have a rounded shape and have a diameter of $D_{cpr}$ as shown in FIG. 3, with their protrusion distance (measured as $D_{cpr}$ minus $D_{ext}$) preferably being from about 0.25 mm to 3.0 mm, more preferably from about 0.5 mm to about 2.75 mm, and most preferably from about 0.51 mm to about 2.54 mm. However, as noted above, neither this protrusion distance nor the shape of the rings are intended to be strictly limiting. As illustrated in FIGS. 1, 2 and 4, the annular clamp positioning rings 16A-D are preferably fabricated in pairs (16 A/B; 16 C/D), forming a region for placement of worm-gear, rachet-style hose clamps, or the like between the rings forming each pair. In this regard, the distances between two pairs of said exterior annular clamp positioning rings (shown in FIG. 2 as W1 and W2), are also not intended to be strictly limiting, but preferably the annular clamp positioning rings of each pair are spaced apart from each other by from about 12.0 mm to about 14.0 mm, more preferably from about 12.2 mm to about 13.2 mm, and most preferably from about 12.6 mm to about 12.8 mm. Similarly, the distance between the two innermost annular clamp positioning rings 16B and 16C is not intended to be strictly limiting (shown as W3 in FIG. 2) except that the rings are fabricated from the relatively lower durometer second material of the lateral portions 14A and 14B, not the relatively higher durometer first material of the medial portion 12. In this regard, the distance of W3 (between ring 16B and ring 16C) is preferably from about 45.0 mm to about 60.0 mm, more preferably from about 47.0 mm to about 60.0 mm, still more preferably from about 49.0 mm to about 59.0 mm, and most preferably from about 53.0 mm to about 55.0 mm, though these values are for a most preferred coupling and are not intended to be strictly limiting.

As illustrated in FIG. 3 and FIG. 4, also integrally fabricated with the other coupling components is interior reinforcing ring 18. Ring 18 is integrally formed with the medial portion 12 of the annular body such that the ring 18 comprises the more rigid first material. As illustrated in FIG. 3, the hollow annular body has an open interior diameter at each end 20, 22 of $D_{int}$, wherein $D_{int}$ ranges from about 37.0 mm to about 39.0 mm, more preferably from about 37.6 mm to about 38.6 mm, and most preferably from about 37.8 mm to about 38.2 mm. The reinforcing ring 18 extends into this interior space, reinforcing the strength of the medial portion 12 so that it can greater resist the material fatigue that has been a problem in the related art. The reinforcing ring 18 extends a distance 24B into the interior space, which is equivalent to $D_{int}$ minus $D_{rri}$ ($D_{int}$-$D_{rri}$).

Additionally, in the most preferred embodiments of this disclosure, the annular body preferably has uniform wall thicknesses throughout the full length of the annular body, such that the interior and exterior circumferences are uniform throughout the full length of the body except for the presence of the interior reinforcing ring 18. In this regard, as illustrated in cross-sectional FIG. 4, as viewed from either side of the sectioned cylindrical coupling (as they would be identical), 24A represents the wall thickness at both lateral ends 20 and 22, which are designed to be identical, although they could be different thicknesses for custom applications.

As illustrated in FIG. 3, which is a straight on end view of the coupling, $D_{cpr}$ represents the diameter of the annular body inclusive of the exterior annular clamp positioning rings; $D_{ext}$ represents the diameter of the annular body exclusive of the exterior annular clamp positioning rings 16A-D; $D_{rri}$ represents the diameter of the central space of the coupling inside of the reinforcing ring 18; and $D_{int}$ represents the diameter of the annular body exclusive of the reinforcing ring 18.

In one embodiment, $D_{ext}$ ranges from about 2.23 inches to about 2.325 inches; $D_{rri}$ ranges from about 1.46 inches to about 1.54 inches; $D_{cpr}$ ranges from about 2.25 inches to about 2.425 inches; and $D_{int}$ ranges from about 1.87 inches to about 1.885 inches. In another embodiment, $D_{ext}$ ranges from about 45 mm to about 51 mm; $D_{rri}$ ranges from about 23 mm to about 28 mm; $D_{cpr}$ ranges from about 45.5 mm to about 57 mm; and as previously stated a preferred range for $D_{int}$ is about 37 mm to about 39 mm. However, none of these ranges are intended to be strictly limiting. Wall thickness 24A is equivalent to $D_{ext}$ minus $D_{int}$ ($D_{ext}$-$D_{int}$). Further, as illustrated in FIGS. 3 and 4, the reinforcing ring 18 is shown with corners molded at an angle (e.g., a 45° angle) at its base 18A that is proximal to the annular body wall. This shape is preferred but not mandatory and the base 18A of the reinforcing ring 18 may instead be at a wider angle, narrower angle, or at a sharp 90° angle with respect to the plane of the ring walls 18B which are normal to the interior surfaces of the annular body. Likewise, as also illustrated in FIGS. 3 and 4, the reinforcing ring 18 is shown with corners molded at an angle (e.g., a 45° angle) at its terminus 18C within the interior space of the coupling 10. This shape is also preferred but not mandatory and the terminus 18C of the reinforcing ring 18 may instead be at a wider angle, narrower angle, or squared off at 90° angles with respect to plane of the ring walls 18B which are normal to the interior surfaces of the annular body. With respect to the preferred dimensions of the coupling body and the reinforcing ring 18, wall thickness 24A preferably ranges from about 4.0 mm to about 6.0 mm, more preferably from about 4.5 mm to about 5.6 mm, and most preferably from about 4.9 mm to about 5.2 mm. The protrusion thickness 24B if the reinforcing ring preferably ranges from about 5.5 mm to about 7.0 mm, more preferably from about 5.8 mm to about 6.9 mm, and most preferably from about 6.2 mm to about 6.5 mm.

Each of the first material and second material comprise polymers that are capable of being molded into a desired shape using a suitable mold, such as compression molding. In the preferred embodiments, the first material comprises ethylene propylene diene monomer rubber (also referred to in the art as "ethylene propylene diene rubber", "ethylene propylene diene terpolymer" rubber, "EPDM" or "EPDM rubber"), preferably EPDM polymers which are preferably known as "Class-A" EPDM rubbers in the art. Suitable EPDM rubbers for both the first and second materials are commercially available, for example, under the mark NORDEL™ from Dow (formerly known as The Dow Chemical Company) of Midland, Michigan, which rubbers are available under several grades that vary in hardness. Also suitable for both the first and second materials are EPDM rubbers commercially available under the mark KELTAN® from Arlanxeo of The Netherlands, which are also available in several grades having varying hardnesses. Alternate polymers for the both the first material and second material non-exclusively include polyvinyl chloride nitrile (PVC Nitrile) rubber and thermoplastic elastomers (TPE) such as polycarbonate (PC), polymethylmethacrylate (PMMA), polystyrene (PS), polyphenylene oxide (PPO), acrylonitrile butadiene styrene (ABS). Particularly preferred polymeric compositions for both the first material (used for making medial portion 12) and the second material (used for making lateral portions 14A and 14B) is EPDM rubber having (Shore) durometer values as previously described herein, i.e. 80 to about 90 for the first material and 70 to about 80 for the second material, where the first material has a higher durometer (is stiffer) than the second material, preferably where the second durometer value is at least 5 less than (i.e., softer than) the first durometer value. For example, in one embodiment the first material is an EPDM rubber having a durometer of 85 or 90 and the second material is an EPDM rubber having a durometer of 70 or 75, wherein each of said EPDM rubbers having said durometer values are commercially available. While EPDM rubber (ethylene-propylene-diene copolymers (ethylene-propylene-diene copolymerized rubber, ethylene-propylene-diene rubbers) is most preferred, other useful polymers non-exclusively include ethylene-propylene copolymers (ethylene-propylene rubbers; EPM), ethylene-methyl(meth)acrylate copolymers, ethylene-ethyl (meth)acrylate copolymers and ethylene-vinyl acetate copolymers. As with most rubbers, EPDM or the preferred alternative rubbers may be compounded with fillers such as carbon black and/or calcium carbonate, may be extended with oils, such as paraffinic oils; and mineral oils, or may be vulcanized/cured with sulfur, peroxide, metal oxide or radiation cure systems, as is well known in the art. As is conventionally known in the art, the hardness of EPDM or other rubbers is affected by the type of curing/vulcanizing agent employed when making the rubbers/polymers. EPDM rubbers are typically cured/vulcanized with sulfur, and the more sulfur used the stronger/harder the material becomes.

As previously described, the coupling is preferably fabricated by compression molding in a suitable mold using conventional methods in the art, such as described in commonly-owned pre-grant publication 2015/0369401, with exemplary molding conditions ranging from a pressure of from about 100 pounds per square inch (psi), or from about 0.5 MPa to about 200 MPa, at a temperature of from about 38° C. (about 100° F.) to about 300° C., and for a duration of from about 1 to about 5 minutes, but the exact conditions would be readily determinable by one skilled in the art depending on the polymers used to make the coupling and the desired dimensions and are not intended to be strictly limiting. In a preferred compression molding process, a first doughnut-shaped slug (i.e., a pre-formed piece or "charge" of the second material having a second durometer value) is placed in an open mold having two mirror-image lateral halves and having a center portion allowing the fabrication of a coupling as illustrated in FIGS. 1-6, followed by a solid round slug (a pre-formed piece or "charge" of the first material having a first durometer value), then another doughnut-shaped slug (of the second material, identical to the first doughnut-shaped slug, also having said same second durometer value, wherein said second durometer value is lower than said first durometer value), followed by compression molding them together under the preferred conditions as determined by one skilled in the art to merge them together into a unitary, tubular molded piece wherein each of the slugs are first pre-heated in an oven to a temperature of from about 100° F. to about 120° F. prior to molding. While compression molding is most preferred, any alternative suitable method of fabrication may be used as would be determined by one skilled in the art, such as injection molding.

Figure 5:
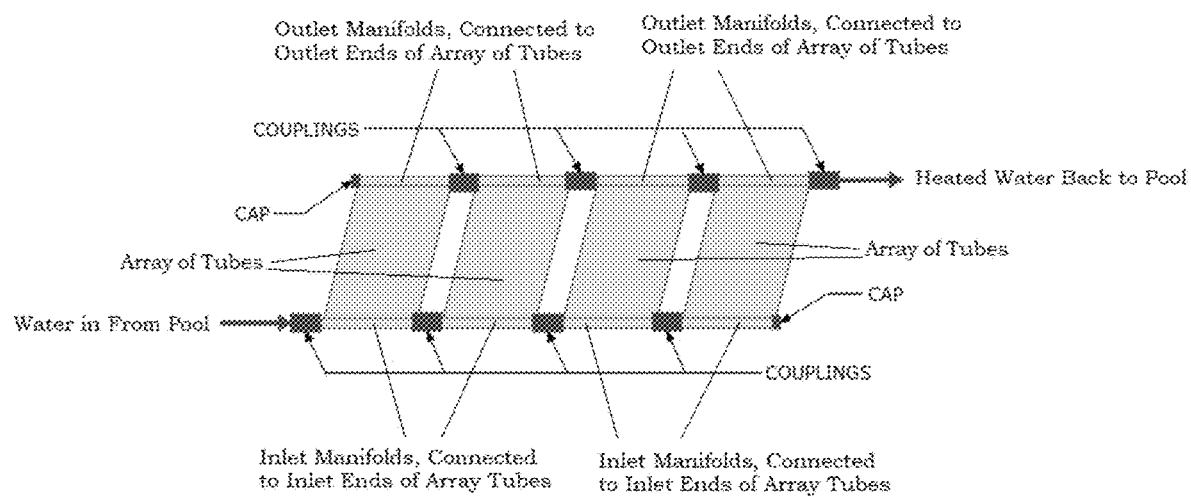
FIG. 5 is a schematic representation, perspective-view, of a solar heating assembly incorporating a plurality of couplings.
Figure 6:
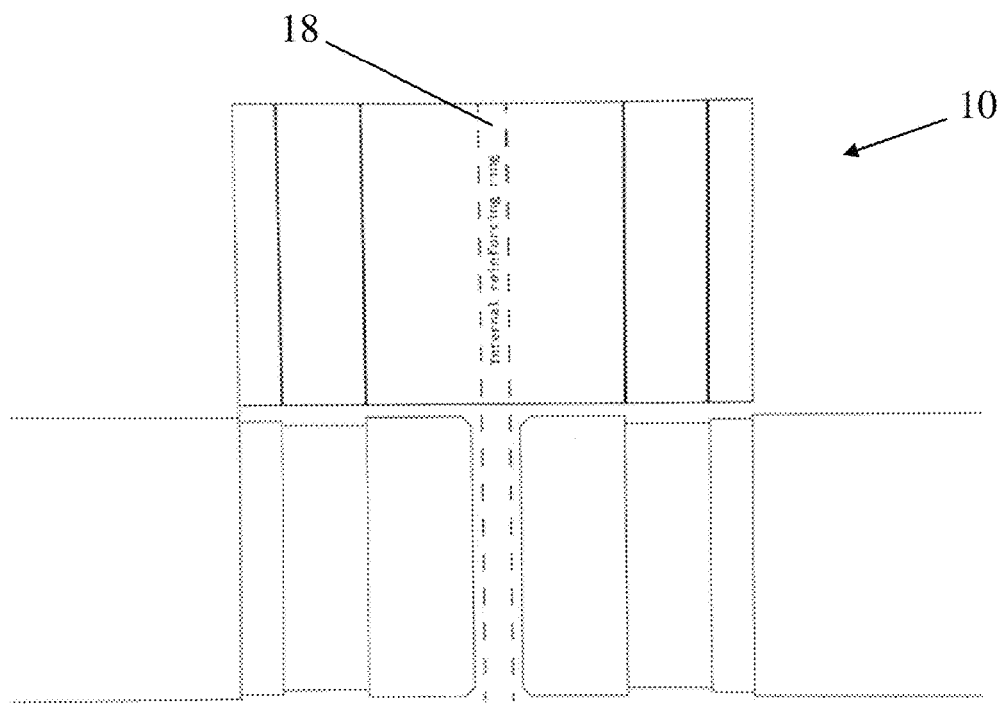
FIG. 6 is a schematic representation, side-view, showing a coupling above two hose ends to be inserted into the coupling and being spaced from the internal reinforcing ring.

As previously stated, in use, the coupling is intended for use in connecting parts of solar heaters/solar heating assemblies for swimming pools and the like that use an array of heat exchange tubes and interconnected inlet and outlet manifolds. A heating assembly including four manifold-connected arrays of tubes which are interconnected with couplings, such as those of this disclosure, is illustrated in FIG. 5. It is commonplace in the art for a rubber coupling to be utilized as an intermediary between the generally cylindrical attachment points at the ends of each manifold or between other hoses/pipes/conduits within the assembly (or even the ends of the heat exchange tubes, an embodiment which is not illustrated in FIG. 5), with opposing ends of the (generally cylindrical) conduits being inserted into the hollow coupling, allowing for fluid communication between the coupling and both the conduits (e.g. manifolds). The couplings are conventionally secured in place with radial clamping assemblies (e.g., hose clamps), which in the context of this disclosure will be positioned between the annular clamp positioning rings. The clamps are tightly secured to the coupling, radially compressing the first lateral portion 14A and/or second lateral portion 14B of the annular body against the respective cylindrical bodies within the coupling, to thereby ensure a water tight seal that does not leak. In a preferred embodiment of this disclosure, each of the (generally cylindrical) conduit ends should remain slightly spaced apart from the internal reinforcing ring 18 rather than directly abutting the reinforcing ring 18 upon installation, as illustrated in FIG. 6. In particular, it has been found that a small space of from about $\frac{1}{16}^{th}$ inch between the inserted hose/conduit ends and the reinforcing ring 18 allows for a slight expansion of each end within the coupling under stagnation temperatures. In order to maintain this gap, the manifold may be designed to have a locating shoulder that stops the depth with the manifold can be positioned within the coupling. The size of this small space may be adjusted as determined by one skilled in the art.

The following non-limiting examples serve to illustrate the preferred embodiments of the disclosure:

Example 1

A mold having a two mirror image lateral halves and a recessed center portion is provided. A first doughnut-shaped slug (second material) is placed in the open mold, followed by a solid round slug (first material), then another doughnut-shaped slug (second material, identical to the first doughnut-shaped slug), with each slug being pre-heated in an oven to a temperature of about 120° F. prior to transfer to the mold. Each of the first and second materials are vulcanized EPDM rubbers vulcanized with sulfur, wherein the first material has a durometer value of 90 and each second material has a durometer value of 80. The mold is heated to a temperature of about 300° F. and closed. The slugs are thereby melted and melded into a single, unitary coupling with a molding time of about 1-3 minutes and at a pressure of about 100 psi.

Example 2

A mold having a two mirror image lateral halves and a recessed center portion is provided. A first doughnut-shaped slug (second material) is placed in the open mold, followed by a solid round slug (first material), then another doughnut-shaped slug (second material, identical to the first doughnut-shaped slug), with each slug being pre-heated in an oven to a temperature of about 120° F. prior to transfer to the mold. Each of the first and second materials are vulcanized EPDM rubbers vulcanized with sulfur, wherein the first material has a durometer value of 80 and each second material has a durometer value of 75. The mold is heated to a temperature of about 300° F. and closed. The slugs are thereby melted and melded into a single, unitary coupling with a molding time of about 1-3 minutes and at a pressure of about 100 psi.

While the present disclosure has been particularly shown and described with reference to preferred embodiments, it will be readily appreciated by those of ordinary skill in the art that various changes and modifications may be made without departing from the spirit and scope of the disclosure. It is intended that the claims be interpreted to cover the disclosed embodiment, those alternatives which have been discussed above and all equivalents thereto.

What is claimed is:

1. A coupling for connecting cylindrical bodies, said coupling comprising:
   a) a unitary, hollow, annular body forming first and second cylindrical openings for surrounding a cylindrical body and to thereby facilitate forming a fluid-tight seal between the coupling and the cylindrical body, the unitary annular body comprising a medial portion, a first lateral portion and a second lateral portion, wherein said first and second lateral portions are integrally connected at opposite ends of said medial portion, the medial portion being made from a first material having a first durometer value, and each of the first and second lateral portions being made from a second material having a second durometer value, wherein said second durometer value is lower than said first durometer value;
   b) exterior annular clamp positioning rings integrally formed with each of the first and second lateral portions of the unitary annular body, the annular clamp positioning rings comprising said second material, wherein each of said exterior annular clamp positioning rings extends from the exterior surface of said first and second lateral portions of the unitary annular body; and
   c) an interior reinforcing ring integrally formed with said medial portion of said annular body, said ring comprising said first material; and
   wherein said coupling is formed by a process that comprises compression molding together a medial slug of said first material that is positioned in between two lateral slugs of said second material, wherein each of the slugs are first pre-heated in an oven prior to compression molding them together in a mold, whereby said compression molding merges the medial slug and the two lateral slugs into said unitary, hollow, annular body.

2. The coupling of claim 1 wherein said first durometer value is from 88 to about 90 and said second durometer value is from about 70 to about 75.

3. The coupling of claim 2 wherein said first material comprises ethylene propylene diene monomer (EPDM) rubber, a thermoplastic elastomer or polyvinylchloride nitrile.

4. The coupling of claim 2 wherein said second material comprises ethylene propylene diene monomer (EPDM) rubber, a thermoplastic elastomer or polyvinylchloride nitrile.

5. The coupling of claim 2 wherein said first material comprises EDPM rubber having a durometer value of from 88 to about 90 and said second material comprises EDPM rubber having a durometer value of from about 70 to about 75.

6. The coupling of claim 1 wherein said first durometer value is from 88 to about 90 and said second durometer value is at least 5 less than said first durometer value.

7. The coupling of claim 1 which comprises two pairs of said exterior annular clamp positioning rings, wherein one of said pairs is integrally formed with each of said first and second lateral portions of the unitary annular body, and wherein the exterior annular clamp positioning rings of each pair are spaced apart from each other by from about 45.0 mm to about 60.0 mm.

8. The coupling of claim 1 further comprising radial clamping assemblies positioned on at least one of said first lateral portion of said annular body and said second lateral portion of said annular body, said radial clamping assemblies being positioned within said annular clamp positioning rings for radially compressing the first lateral portion and/or second lateral portion of the annular body and thereby sealing the annular body against said cylindrical body.

9. A solar heating assembly for a pool, said solar heating assembly comprising an array of parallel tubes, each tube having an inlet end connected to an inlet manifold and having an outlet end connected to an outlet manifold, wherein each of said inlet ends is connected to said inlet manifold via a coupling as claimed in claim 1 and wherein each of said outlet ends is connected to said outlet manifold via a coupling as claimed in claim 1.

10. The solar heating assembly of claim 9 wherein water from said pool enters the solar heating assembly via the inlet manifold and wherein water is pumped back from said solar heating assembly into said pool via the outlet manifold.

11. The solar heating assembly of claim 9 wherein each of the first material of each coupling and the second material of each coupling comprises ethylene propylene diene monomer (EPDM) rubber, polycarbonate, polymethylmethacrylate, polystyrene, polyphenylene oxide, acrylonitrile butadiene styrene or polyvinyl chloride nitrile, wherein the first durometer value is from 88 to about 90 and said second durometer value of said second material is at least 5 less than the first durometer value of the first material.

12. The solar heating assembly of claim 11 wherein the first material of each coupling comprises EDPM rubber having a durometer value of from 88 to about 90 and the second material of each coupling comprises EDPM rubber having a durometer value of from about 70 to about 75.

13. The solar heating assembly of claim 11 wherein said second durometer value is at least 10 less than said first durometer value.

14. The solar heating assembly of claim 11 wherein each coupling comprises two pairs of said exterior annular clamp positioning rings, wherein one of said pairs is integrally formed with each of said first and second lateral portions of the unitary annular body, and wherein the exterior annular clamp positioning rings of each pair are spaced apart from each other, wherein each coupling connecting each tube inlet end to the inlet manifold is clamped to both the tube and the inlet manifold with a radial clamping assembly positioned within said annular clamp positioning rings, wherein each coupling connecting each tube outlet end to the outlet manifold is clamped to both the tube and the outlet manifold with a second radial clamping assembly positioned within said annular clamp positioning rings, wherein said radial clamping assemblies radially compress the first lateral portion and/or second lateral portion of each coupling, thereby sealing the coupling against the tubes and the manifolds.

15. A solar heater for a pool, said solar heater comprising a heating assembly, which heating assembly comprises a plurality of interconnected inlet and outlet manifolds; wherein each of said inlet manifolds interconnected with each other via one or more reinforced couplings as claimed in claim 1, and wherein each of said outlet manifolds are interconnected with each other via one or more reinforced couplings as claimed in claim 1.

16. The solar heater of claim 15 wherein water from said pool enters the heating assembly via one of said inlet manifolds and wherein water is pumped back into said pool via one of said outlet manifolds.

17. The solar heater of claim 15 wherein each of the first material of each coupling and the second material of each coupling comprises ethylene propylene diene monomer (EPDM) rubber, polycarbonate, polymethylmethacrylate, polystyrene, polyphenylene oxide, acrylonitrile butadiene styrene or polyvinyl chloride nitrile, wherein the first durometer value is from 88 to about 90 and said second durometer value of said second material is at least 5 less than the first durometer value of the first material.

18. The solar heater of claim 17 wherein said first material of each coupling comprises EDPM rubber having a durometer value of from 88 to about 90 and the second material of each coupling comprises EDPM rubber having a durometer value of from about 70 to about 75.

19. The solar heater of claim 15 wherein said first durometer value is from 88 to about 90 and said second durometer value is at least 5 less than said first durometer value.

20. The solar heater of claim 15 wherein each coupling comprises two pairs of said exterior annular clamp positioning rings, wherein one of said pairs is integrally formed with each of said first and second lateral portions of the unitary annular body, and wherein the exterior annular clamp positioning rings of each pair are spaced apart from each other, wherein each coupling connecting the manifolds is clamped to both the manifolds with radial clamping assemblies positioned within said annular clamp positioning rings, thereby sealing the coupling against the manifolds.

21. The coupling of claim 1 wherein each of the medial slug and the two lateral slugs are pre-heated in said oven to a temperature of from about 100° F. to about 120° F. prior to compression molding them together in said mold.

22. A process for forming a coupling for connecting cylindrical bodies, said coupling comprising:
   a) a unitary, hollow, annular body forming first and second cylindrical openings for surrounding a cylindrical body and to thereby facilitate forming a fluid-tight seal between the coupling and the cylindrical body, the unitary annular body comprising a medial portion, a first lateral portion and a second lateral portion, wherein said first and second lateral portions are integrally connected at opposite ends of said medial portion, the medial portion being made from a first material having a first durometer value, and each of the first and second lateral portions being made from a second material having a second durometer value, wherein said second durometer value is lower than said first durometer value;
   b) exterior annular clamp positioning rings integrally formed with each of the first and second lateral portions of the unitary annular body, the annular clamp positioning rings comprising said second material, wherein each of said exterior annular clamp positioning rings extends from the exterior surface of said first and second lateral portions of the unitary annular body; and
   c) an interior reinforcing ring integrally formed with said medial portion of said annular body, said ring comprising said first material; and
   wherein said process comprises compression molding together a medial slug of said first material that is positioned in between two lateral slugs of said second material, wherein each of the slugs are first pre-heated in an oven prior to compression molding them together in a mold, whereby said compression molding merges the medial slug and the two lateral slugs into said unitary, hollow, annular body.

23. The process of claim 22 wherein each of the medial slug and two lateral slugs are pre-heated in said oven to a temperature of from about 100° F. to about 120° F. prior to compression molding them together in said mold.

* * * * *